United States Patent
Wu et al.

(10) Patent No.: US 9,231,810 B2
(45) Date of Patent: Jan. 5, 2016

(54) CARRIER FREQUENCY OFFSET CALIBRATION METHOD

(71) Applicant: Realtek Semiconductor Corp., HsinChu (TW)

(72) Inventors: Chih-Yung Wu, Changhua County (TW); Kai-Wei Yen, Kaohsiung (TW); Chung-Yao Chang, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 14/552,458

(22) Filed: Nov. 24, 2014

(65) Prior Publication Data

US 2015/0156048 A1    Jun. 4, 2015

(30) Foreign Application Priority Data

Dec. 2, 2013  (TW) .............................. 102144075 A

(51) Int. Cl.
*H04L 27/06* (2006.01)
*H04L 27/26* (2006.01)
*H04L 25/02* (2006.01)

(52) U.S. Cl.
CPC ........ *H04L 27/2657* (2013.01); *H04L 25/0204* (2013.01)

(58) Field of Classification Search
CPC ............ H04L 27/2655; H04L 27/2657; H04L 27/2659; H04L 27/266; H04L 2027/0026; H04L 2027/0028; H04L 2027/003; H04L 2027/0032; H04L 2027/0034; H04L 2027/0036
USPC .......... 375/259, 260, 285, 316, 344, 346, 348
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 7,065,163 B2 | 6/2006 | Rick | | |
| 7,088,782 B2 * | 8/2006 | Mody et al. | ................... | 375/260 |
| 7,684,472 B2 * | 3/2010 | Litwin et al. | ................... | 375/150 |
| 8,363,757 B1 * | 1/2013 | Meng et al. | ................... | 375/344 |
| 8,699,638 B2 * | 4/2014 | Yi | ................. | 375/343 |
| 2005/0078774 A1 * | 4/2005 | Rick et al. | ..................... | 375/344 |
| 2005/0175114 A1 * | 8/2005 | Jones et al. | ..................... | 375/260 |
| 2008/0144731 A1 * | 6/2008 | Marchok et al. | ............. | 375/260 |

* cited by examiner

*Primary Examiner* — Siu Lee
(74) *Attorney, Agent, or Firm* — Winston Hsu; Scott Margo

(57) ABSTRACT

A carrier frequency offset (CFO) calibration method for calibrating a CFO of a receiver is proposed. The CFO calibration method includes: receiving at least one CFO estimation value generated by digital CFO estimation; generating a CFO adjustment value according to the at least one CFO estimation value; and adjusting an oscillation frequency of an oscillator of the receiver according to the CFO adjustment value.

18 Claims, 4 Drawing Sheets

CARRIER FREQUENCY OFFSET CALIBRATION METHOD

BACKGROUND OF THE INVENTION

1. Field of the Invention

The disclosed embodiments of the present invention relate to a carrier frequency offset (CFO) calibration method, and more particularly, to a CFO calibration method applied to an Orthogonal Frequency Division Multiplexing (OFDM) receiver.

2. Description of the Prior Art

In general, in an Orthogonal Frequency Division Multiplexing (OFDM) communication system such as an OFDM communication system 100 shown in FIG. 1, since there is a frequency difference between oscillators (not shown) in a transmission terminal 102 and a receiving terminal 104, causing to the carrier frequency offset (CFO) problem in frequency domain and sample clock offset (SCO) problem in time domain in receiving terminal 104.

The CFO and the SCO are main reasons of damaging the system carrier orthogonality. Under conditions of no calibration or lack of calibration, it will cause a severe Inter Carrier Interference (ICI). Thus, it is important about how to perform the CFO calibration in the OFDM receiver. A conventional method of solving the above problem is using a phase lock loop (PLL) to perform the CFO calibration. As shown in FIG. 2, a PLL 200 uses a phase detector (PD) 202 to find out a phase difference between an input signal and a local clock first, and then calculates a frequency difference by a math calculation. After passing through a loop filter 204, an output clock of a voltage-controlled oscillator (VCO) 206 will be adjusted according to the frequency difference in order to change the frequency of the local oscillator, to perform the CFO calibration or tracking. However, the PLL is usually realized in an analog way, and it is not only difficult in design, but also easy to be affected by process floating, and it requires more chip area.

In addition, there is another conventional method which can be realized by digital signal processing only. Specifically, this conventional method does not use the analog circuit or radio frequency (RF) circuit for the calibration, but simply performs the CFO estimation by a base band (BB) digital circuit, and performs a CFO compensation by signal processing to eliminate influences of the carrier interference. In general, besides the estimation and the compensation, it is practical to perform CFO tracking & SCO tracking based on a pilot signal in the signals, so as to reduce the influence caused by problems of inaccurate estimations and compensations. However, although it is easier to use the BB digital circuit to perform the CFO calibration, but the following problems might occur. First, a DC notch filter might be affected by the CFO and signals near DC are filtered and can not be restored. Second, when the CFO effect is serious, the CFO estimation capability of the digital circuit might reduce greatly due to preamble symbol detection errors or decode errors.

Thus, there is immediate requirement of an innovative CFO calibration method to reduce cost and error rate.

SUMMARY OF THE INVENTION

It is therefore one of the objectives of the present invention to provide a carrier frequency offset (CFO) calibration method applied to an Orthogonal Frequency Division Multiplexing (OFDM) receiver, so as to solve the problem of harmonic oscillation.

In accordance with an embodiment of the present invention, an exemplary CFO calibration method is disclosed. The exemplary CFO calibration method comprises: receiving at least one CFO estimation value generated by a digital CFO estimation; generating a CFO adjustment value according to the at least one CFO estimation value; and adjusting an oscillation frequency of an oscillator of the receiver according to the CFO adjustment value.

In accordance with an embodiment of the present invention, an exemplary machine readable medium is disclosed. The exemplary machine readable medium stores a program code, wherein when the program code is executed by a processor, the program code makes the processor execute following steps to calibrate carrier frequency offset (CFO) of a receiver: receiving at least one CFO estimation value generated by a digital CFO estimation; generating a CFO adjustment value according to the at least one CFO estimation value; and adjusting an oscillation frequency of an oscillator of the receiver according to the CFO adjustment value.

Compared to the prior art, the CFO calibration method applied to an Orthogonal Frequency Division Multiplexing (OFDM) receiver disclosed by the present invention can obviously reduce complexity of an analog circuit and reduce CFO effect of source signal (RF signal) causing preamble process performance degraded.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection vian Other devices and connections.

The present invention generating a calibrate carrier frequency offset (CFO) adjustment value according to a CFO estimation value generated by a digital CFO calculating circuit of conventional receiver based on a digital CFO estimation, wherein the digital CFO estimation can be a conventional method. For example, the feature of the digital CFO estimation is not utilizing an analog circuit or a radio frequency (RF) circuit to perform the estimation, but simply perform the CFO estimation by a base band (BB) circuit, wherein the estimation theory can be defined by a system spec or realized by a designer using another algorithm. The feature of the present invention is processing the CFO adjustment value generated by the digital CFO estimation, and further making the processed signal feedback to the analog circuit to adjust a source oscillator frequency of a clock signal in a front end of the receiver, but not only performing a compensation at the digital BB circuit in a back end of the receiver. The detail illustration is in the following paragraphs.

Figure 1:
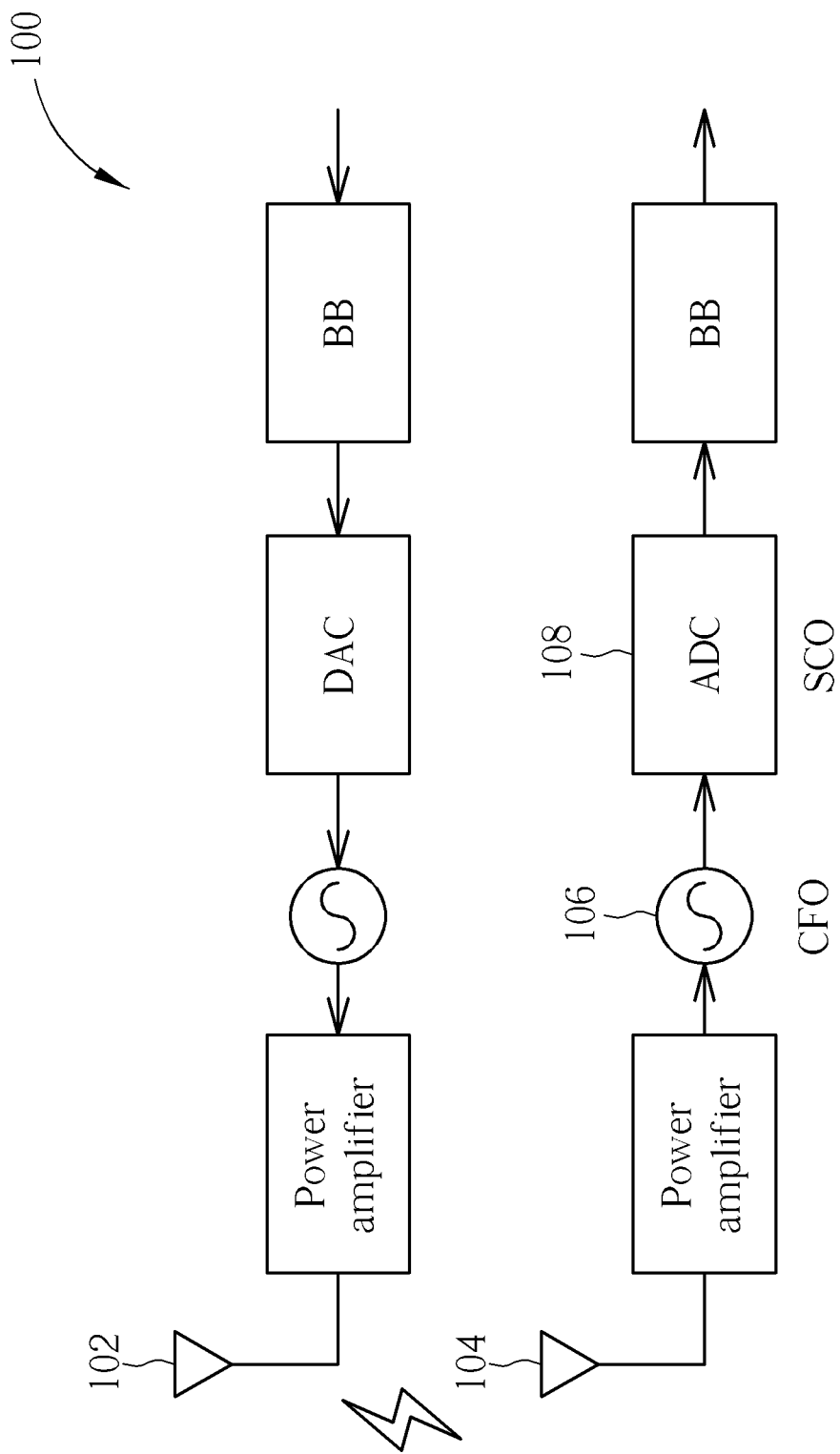
FIG. 1 is a simplified diagram of a conventional Orthogonal Frequency Division Multiplexing (OFDM) communication system.
Figure 2:
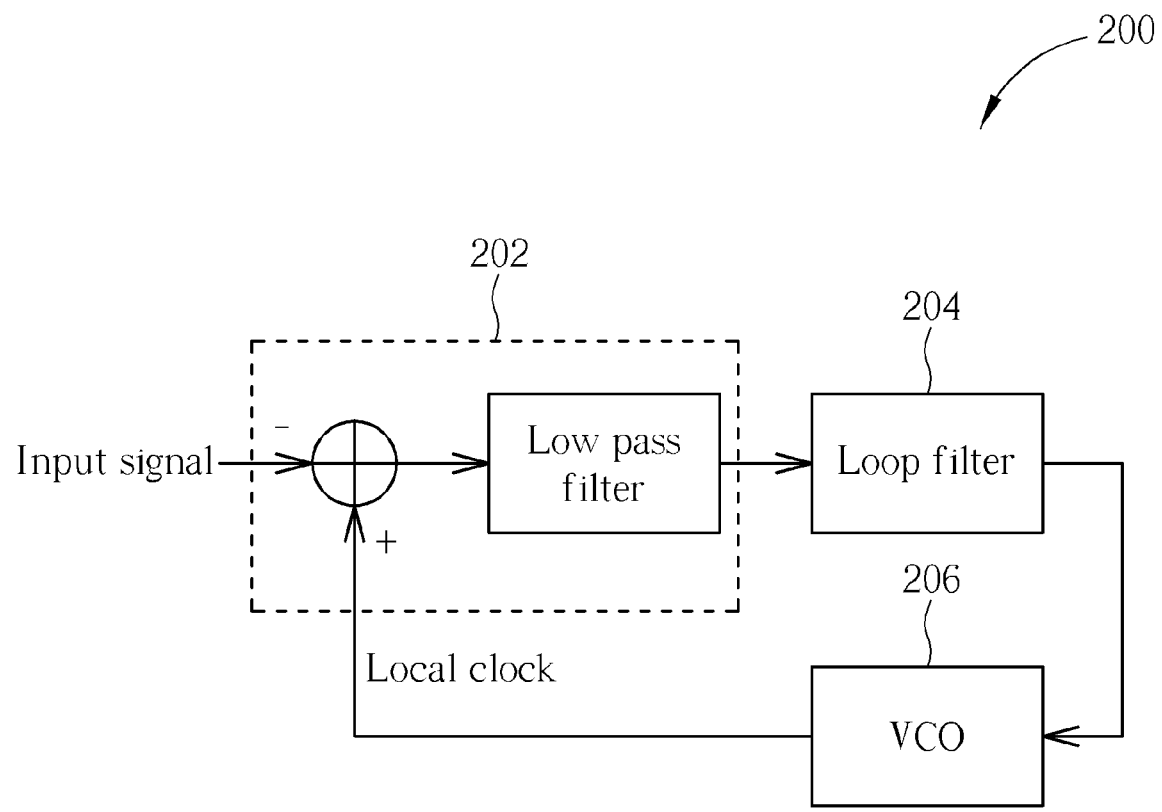
FIG. 2 is a simplified diagram of a conventional phase lock loop (PLL).
Figure 3:
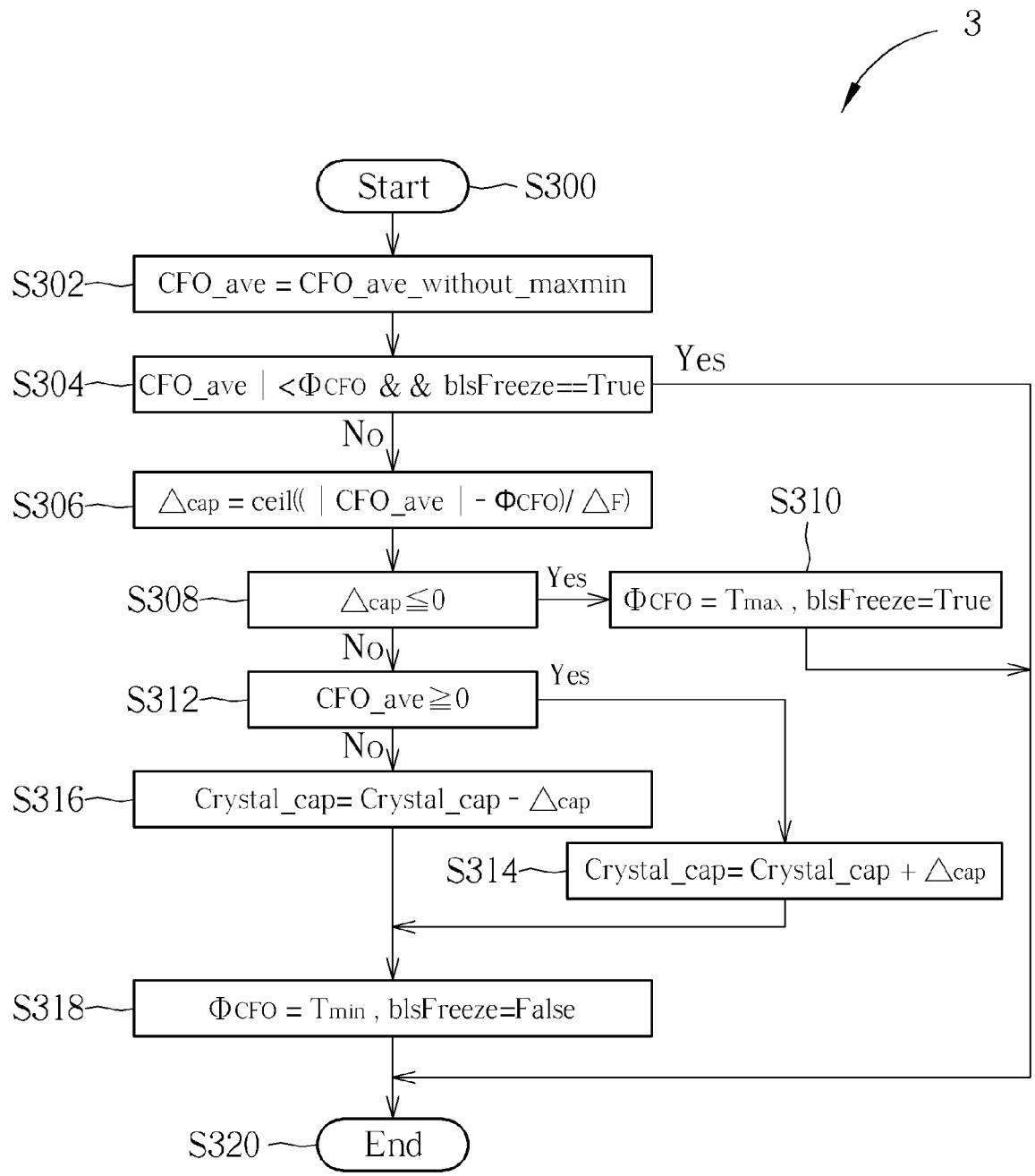
FIG. 3 is a flowchart showing a CFO calibration method in accordance with an exemplary embodiment of the present invention

Please refer to FIG. 3. FIG. 3 is a flowchart showing a CFO calibration method 3 in accordance with an exemplary embodiment of the present invention, wherein the CFO calibration method can be applied to an Orthogonal Frequency Division Multiplexing (OFDM) receiver. The CFO calibration method 3 calculates a CFO adjustment value CFO (i.e. a capacitance adjustment value $\Delta_{cap}$ of an oscillator) according to a CFO estimation value CFO_est generated by a digital CFO calculating circuit in the OFDM receiver and a frequency offset value $\Delta_F$ and a frequency offset direction corresponding to unit capacitance of a control capacitance Crystal_cap of the oscillator in the OFDM receiver. In step S302, extreme values in all CFO estimation values CFO_est during a specific time interval T can be omitted in order to reduce over adjusting conditions and extreme conditions, and calculate a mean value of the rest of CFO estimation values CFO_est to obtain a mean CFO estimation value CFO_ave_without_maxmin without extreme values. The mean CFO estimation value CFO_ave_without_maxmin is viewed as a mean CFO estimation value CFO_ave during the specific time interval T. Please note that since the oscillator frequency in a transmission terminal than the oscillator frequency in a receiving terminal might be faster or slower, the mean CFO estimation value CFO_ave might be a positive value or a negative value.

Next, in step S304, determining whether an absolute value of the mean CFO estimation value |CFO_ave| is smaller than a threshold value $\Phi_{CFO}$ and a flag bIsFreeze is equal to True is performed. If yes, then go to step S320. If no, then go to step S306 and calculate a capacitance adjustment value $\Delta_{cap}$=ceil (((|CFO_ave|−$\Phi_{CFO}$)/$\Delta_F$), wherein ceil((((CFO_ave|−$\Phi_{CFO}$)/$\Delta_F$) is a roundup calculation of (|CFO_ave|−$\Phi_{CFO}$)/$\Delta_F$. Next, in step S308, determining whether $\Delta_{cap}$ is smaller than or equal to 0 is performed. If yes, then go to step S310 and determine the threshold value $\Phi_{CFO}$ is a first threshold value $T_{max}$ and set the flag bIsFreeze to be True. If $\Delta_{cap}$ is determined to be not smaller than or equal to 0 in the step S308, then go to step S312.

In step S312, determining whether the mean CFO estimation value CFO_ave is greater than or equal to 0 is performed. If yes, then go to step S314 and set the control capacitance of the oscillator in the OFDM receiver to be Crystal_cap=Crystal_cap+$\Delta_{cap}$, and then go to step S318. Otherwise, if the mean CFO estimation value CFO_ave is not greater than or equal to 0, then go to step S316 and set the control capacitance of the oscillator in the OFDM receiver to be Crystal_cap=Crystal_cap−$\Delta_{cap}$, and then go to step S318. In step S318, determine the threshold value $\Phi_{CFO}$ is a second threshold value $T_{min}$ and set the flag bIsFreeze to be False is performed.

After the absolute value of the mean CFO estimation value |CFO_ave| is over the first threshold value $T_{max}$, the CFO adjustment value is constantly updated according to a mean CFO estimation value generated during a subsequent specific time interval to calibrate the oscillator of the OFDM receiver, until the mean CFO estimation value generated during the subsequent specific time interval is lower than the second threshold value $T_{min}$. That is, the hysteresis comparison theory is utilized for eliminating instability of the mean CFO estimation value CFO_ave in a range between the second threshold value $T_{min}$ and the first threshold value $T_{max}$.

In addition, some specific steps of the flowchart showing a CFO calibration method 3 in FIG. 3 can have changes according to different requirements. For example, it is practical to determine whether a difference $\Delta$CFO_ave of the mean CFO estimation value CFO_ave during a specific time interval $T_1$ and a mean CFO estimation value CFO_ave$_{-1}$ during a previous specific time interval $T_{-1}$ is over an abnormal threshold value. That is, if the mean CFO estimation value CFO_ave suddenly has a very big change compared with the mean CFO estimation value CFO_ave$_{-1}$, then the mean CFO estimation value CFO_ave is an accidental abnormal value which is caused by noises or some abnormal conditions, and thus the accidental abnormal value is not adopted to generate the capacitance adjustment value $\Delta_{cap}$ to avoid wrong calibration. In addition, for example, if $\Delta$CFO_ave is over a threshold value $\Phi_{CFO\_diff}$ then terminate the CFO calibration of the specific time interval $T_1$. However, if this condition constantly happens, for example, a difference $\Delta$CFO_ave$_{-1}$ between the mean CFO estimation value CFO_ave$_{-1}$ calculated in the previous specific time interval $T_{-1}$ and the mean CFO estimation value CFO_ave$_{-2}$ calculated in another previous specific time interval $T_{-2}$ is over the threshold value $\Phi_{CFO\_diff}$ and $\Delta$CFO_ave is also over the threshold value $\Phi_{CFO\_diff}$ then it is possible that this drastic change is not an accidental abnormal condition, but is a CFO requires the calibration. The mean CFO estimation value CFO_ave should be viewed as a normal one and adopted to generate the capacitance adjustment value $\Delta_{cap}$ to adjust the oscillator in the receiving terminal.

Figure 4:
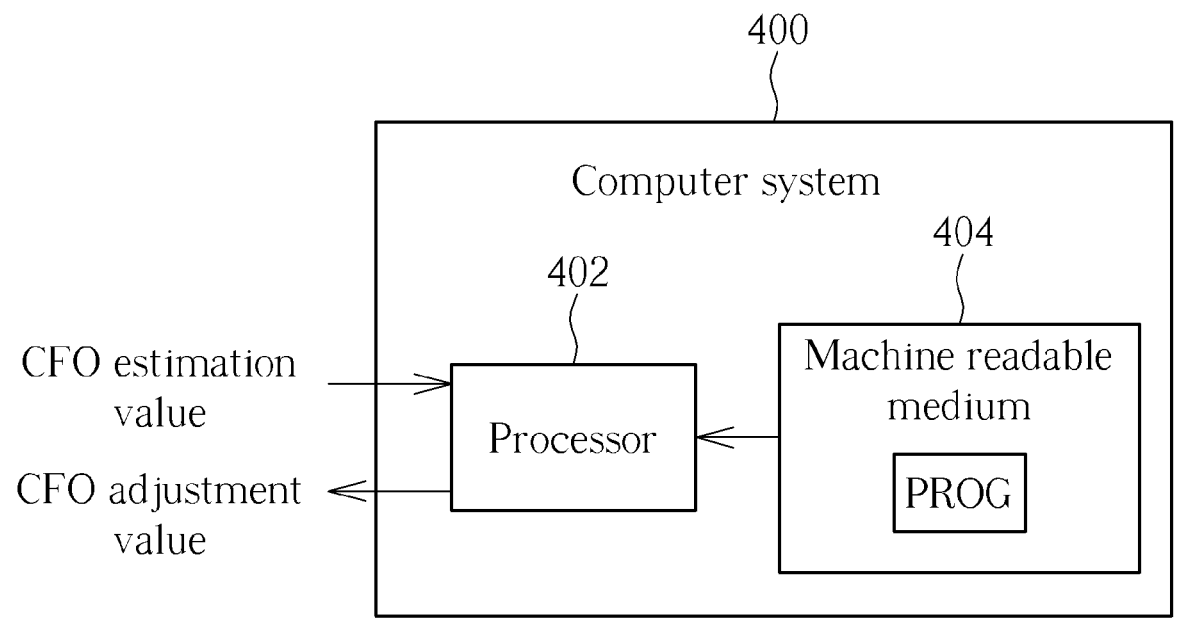
FIG. 4 is a simplified diagram of a machine readable medium applied to the CFO calibration in accordance with an embodiment of the present invention.

Please refer to FIG. 4. FIG. 4 is a simplified diagram of a machine readable medium applied to the CFO calibration in accordance with an embodiment of the present invention. A computer system 400 comprises a processor 402 and a machine readable medium 404. For example, the computer system 400 can be a personal computer (PC) and the machine readable medium 404 can be any kind of storage device with data storing function in the PC, such as volatile memory, non-volatile memory, hard disk, optical disk, etc. In this embodiment, the machine readable medium 404 stores a program code PROG. When the program code PROG is loaded and executed by the processor 402, the program code PROG will make the processor receive at least one CFO estimation value generated by a digital CFO estimation to generate a CFO adjustment value, and adjust an oscillation frequency of an oscillator of the receiver according to the CFO adjustment value. That is, the program code PROG makes the processor 402 executes the CFO calibration method disclosed by the present invention (i.e. the steps S300-S324 in FIG. 3). Since those of average skill in this art can understand the timing analysis operation of the processor 402 executing the program code PROG by referring to the above timing analysis method, further explanation of the details and operations are omitted herein for the sake of brevity.

The CFO calibration method applied to the OFDM receiver disclosed by the present invention can be realized by a BB digital circuit. It also can be realized by a software or a firmware, and makes the calculation result written into the register of the BB digital circuit or feedback to an analog circuit to control frequency of the oscillator, in order to achieve the purpose of CFO calibration. Compared to the prior art, the present invention can obviously reduce complexity of an analog circuit and reduce CFO effect of source signal (RF signal) causing preamble process performance degraded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrier frequency offset (CFO) calibration method for calibrating a CFO of a receiver, the CFO calibration method comprising:
    receiving at least one CFO estimation value generated by a digital CFO estimation;
    calculating a mean CFO estimation value according to a plurality of CFO estimation values generated by the digital CFO estimation during a specific time interval;
    determining whether the mean CFO estimation value is over a threshold value;
    when the mean CFO estimation value is over the threshold value, generating a CFO adjustment value according to the mean CFO estimation value; and
    adjusting an oscillation frequency of an oscillator of the receiver according to the CFO adjustment value;
    wherein the step of determining whether the mean CFO estimation value is over the threshold value further comprises: after the mean CFO estimation value is over the threshold value, constantly updating the CFO adjustment value according to a mean CFO estimation value generated during a subsequent specific time interval, until the mean CFO estimation value generated during the subsequent specific time interval is lower than another threshold value.

2. The CFO calibration method of claim 1, wherein the receiver is an Orthogonal Frequency Division Multiplexing (OFDM) receiver.

3. The CFO calibration method of claim 1, wherein the step of generating the CFO adjustment value according to the at least one CFO estimation value comprises:
    calculating the CFO adjustment value according to the at least one CFO estimation value and a frequency offset value and a frequency offset direction corresponding to unit capacitance of a control capacitance of the oscillator.

4. The CFO calibration method of claim 3, wherein the step of adjusting the oscillation frequency of the oscillator of the receiver according to the CFO adjustment value comprises:
    adjusting control capacitance of the oscillator according to the CFO adjustment value.

5. The CFO calibration method of claim 1, wherein the step of calculating the mean CFO estimation value according to the CFO estimation values generated by the digital CFO estimation during the specific time interval comprises:
    selecting a part of CFO estimation values from the CFO estimation values, wherein the part of CFO estimation values do not comprise at least of a maximum value and a minimum value of the CFO estimation values; and
    calculating the mean CFO estimation value according to the part of CFO estimation values.

6. The CFO calibration method of claim 1, wherein the step of generating the CFO adjustment value according to the at least one CFO estimation value comprises:
    calculating a mean CFO estimation value of each time interval according to a plurality of CFO estimation values generated by the digital CFO estimation during the each time interval of a current time interval and a plurality of previous time intervals, to obtain a plurality of mean CFO estimation values corresponding to the current time interval and the previous time intervals, respectively;
    determining whether the mean CFO estimation value is over a threshold value; and
    when the mean CFO estimation value is over the threshold value, generating the CFO adjustment value according to the mean CFO estimation value.

7. A non-transitory machine readable medium for storing a program code, wherein when the program code is executed by a processor, the program code makes the processor execute following steps to calibrate carrier frequency offset (CFO) of a receiver:
    receiving at least one CFO estimation value generated by a digital CFO estimation;
    determining whether the mean CFO estimation value is over a threshold value;
    when the mean CFO estimation value is over the threshold value, generating a CFO adjustment value according to the mean CFO estimation value; and adjusting an oscillation frequency of an oscillator of the receiver according to the CFO adjustment value;
    wherein the step of determining whether the mean CFO estimation value is over the threshold value further comprises:
    after the mean CFO estimation value is over the threshold value, constantly updating the CFO adjustment value according to a mean CFO estimation value generated during a subsequent specific time interval, until the mean CFO estimation value generated during the subsequent specific time interval is lower than another threshold value.

8. The non-transitory machine readable medium of claim 7, wherein the receiver is an Orthogonal Frequency Division Multiplexing (OFDM) receiver.

9. The non-transitory machine readable medium of claim 7, wherein the step of generating the CFO adjustment value according to the at least one CFO estimation value comprises:
    calculating the CFO adjustment value according to the at least one CFO estimation value and a frequency offset value and a frequency offset direction corresponding to unit capacitance of a control capacitance of the oscillator.

10. The non-transitory machine readable medium of claim 9, wherein the step of adjusting the oscillation frequency of the oscillator of the receiver according to the CFO adjustment value comprises:
    adjusting control capacitance of the oscillator according to the CFO adjustment value.

11. The non-transitory machine readable medium of claim 7, wherein the step of generating the CFO adjustment value according to the at least one CFO estimation value comprises:
    calculating a mean CFO estimation value of each time interval according to a plurality of CFO estimation values generated by the digital CFO estimation during the each time interval of a current time interval and a plurality of previous time intervals, to obtain a plurality of mean CFO estimation values corresponding to the current time interval and the previous time intervals, respectively;
    determining whether the mean CFO estimation value is over a threshold value; and
    when the mean CFO estimation value is over the threshold value, generating the CFO adjustment value according to the mean CFO estimation value.

12. The non-transitory machine readable medium of claim 7, wherein the step of determining the mean CFO estimation value according to the CFO estimation values generated by the digital CFO estimation during the specific time interval comprises:
- selecting a part of CFO estimation values from the CFO estimation values, wherein the part of CFO estimation values do not comprise at least of a maximum value and a minimum value of the CFO estimation values; and
- calculating the mean CFO estimation value according to the part of CFO estimation values.

13. A carrier frequency offset (CFO) calibration method for calibrating a CFO of a receiver, the CFO calibration method comprising:
- receiving at least one CFO estimation value generated by a digital CFO estimation;
- calculating a mean CFO estimation value of each time interval according to a plurality of CFO estimation values generated by the digital CFO estimation during the each time interval of a current time interval and a plurality of previous time intervals, to obtain a plurality of mean CFO estimation values corresponding to the current time interval and the previous time intervals, respectively;
- determining whether differences between mean CFO estimation values corresponding to each two successive time intervals in the current time interval and the previous time intervals respectively are over a threshold value;
- when all of the differences between the mean CFO estimation values corresponding to each two successive time intervals in the current time interval and the previous time intervals respectively are over the threshold value, generating a CFO adjustment value according to the mean CFO estimation value of the current time interval; and
- adjusting an oscillation frequency of an oscillator of the receiver according to the CFO adjustment value.

14. The CFO calibration method of claim 13, wherein the receiver is an Orthogonal Frequency Division Multiplexing (OFDM) receiver.

15. The CFO calibration method of claim 13, wherein the step of generating the CFO adjustment value according to the at least one CFO estimation value comprises:
- calculating the CFO adjustment value according to the at least one CFO estimation value and a frequency offset value and a frequency offset direction corresponding to unit capacitance of a control capacitance of the oscillator.

16. The CFO calibration method of claim 15, wherein the step of adjusting the oscillation frequency of the oscillator of the receiver according to the CFO adjustment value comprises:
- adjusting control capacitance of the oscillator according to the CFO adjustment value.

17. The CFO calibration method of claim 13, wherein the step of generating the CFO adjustment value according to the at least one CFO estimation value comprises:
- calculating a mean CFO estimation value according to a plurality of CFO estimation values generated by the digital CFO estimation during a specific time interval;
- determining whether the mean CFO estimation value is over a threshold value; and
- when the mean CFO estimation value is over the threshold value, generating the CFO adjustment value according to the mean CFO estimation value.

18. The CFO calibration method of claim 17, wherein the step of calculating the mean CFO estimation value according to the CFO estimation values generated by the digital CFO estimation during the specific time interval comprises:
- selecting a part of CFO estimation values from the CFO estimation values, wherein the part of CFO estimation values do not comprise at least of a maximum value and a minimum value of the CFO estimation values; and
- calculating the mean CFO estimation value according to the part of CFO estimation values.

* * * * *